(12) United States Patent
Maude

(10) Patent No.: US 7,189,271 B2
(45) Date of Patent: Mar. 13, 2007

(54) CATALYTIC REACTOR

(75) Inventor: Jason Andrew Maude, Cheadle (GB)

(73) Assignee: Compactgtl PLC, London (GB)

( * ) Notice: Subject to any disclaimer, the term of this patent is extended or adjusted under 35 U.S.C. 154(b) by 181 days.

(21) Appl. No.: 10/491,780

(22) PCT Filed: Sep. 23, 2002

(86) PCT No.: PCT/GB02/04299

§ 371 (c)(1),
(2), (4) Date: Apr. 6, 2004

(87) PCT Pub. No.: WO03/033132

PCT Pub. Date: Apr. 24, 2003

(65) Prior Publication Data

US 2004/0237303 A1    Dec. 2, 2004

(30) Foreign Application Priority Data

Oct. 18, 2001 (GB) .................................. 0125000.0

(51) Int. Cl.
*B01J 19/24* (2006.01)
*F28D 9/00* (2006.01)

(52) U.S. Cl. .................. 48/197 R; 48/127.9; 48/127.7; 48/127.5; 422/190; 422/211; 422/222

(58) Field of Classification Search ................ 422/211, 422/222, 190, 177, 174; 518/704; 48/127.9, 48/127.7, 127.5, 197 R
See application file for complete search history.

(56) References Cited

U.S. PATENT DOCUMENTS 5,328,359 A * 7/1994 Retallick .................... 431/326
5,342,588 A * 8/1994 Humpolik ................... 422/311
5,672,629 A * 9/1997 Heil et al. ................... 518/704
2003/0105172 A1* 6/2003 Bowe et al. ................. 518/728
2004/0237303 A1* 12/2004 Maude ......................... 29/890
2005/0013769 A1* 1/2005 Bowe et al. ................. 423/652
2005/0234138 A1* 10/2005 Bowe .......................... 518/726

FOREIGN PATENT DOCUMENTS

| EP | 0 571 056 | * | 5/1993 |
| EP | 0885653 | * | 6/1998 |
| EP | 0885653 | | 12/1998 |
| GB | 1490977 | | 11/1977 |
| GB | 1 531 134 | * | 11/1978 |
| GB | 1531134 | | 11/1978 |
| GB | 1 546 097 | * | 5/1979 |
| GB | 1546097 | | 5/1979 |
| WO | WO 01/51194 | * | 7/2001 |
| WO | WO 03/033132 | * | 4/2003 |

* cited by examiner

Primary Examiner—N. Bhat
(74) Attorney, Agent, or Firm—William H. Holt

(57) ABSTRACT

A catalytic reactor comprises a plurality of thin tray-like metal sheets each with a peripheral rim and arranged as a stack to define first gas flow channels between adjacent sheets, alternating with second gas flow channels between adjacent sheets, so as to ensure good thermal contact between gases in the first and the second gas flow channels. Each sheet also defines at least four apertures for flow of gases, and tubes and seal apertures in one sheet to corresponding apertures in the adjacent sheet. The gas flows through the channels may be guided by corrugations, and are preferably in countercurrent in adjacent channels. Appropriate catalysts are coated onto the sheets and in the two gas flow channels.

10 Claims, 1 Drawing Sheet

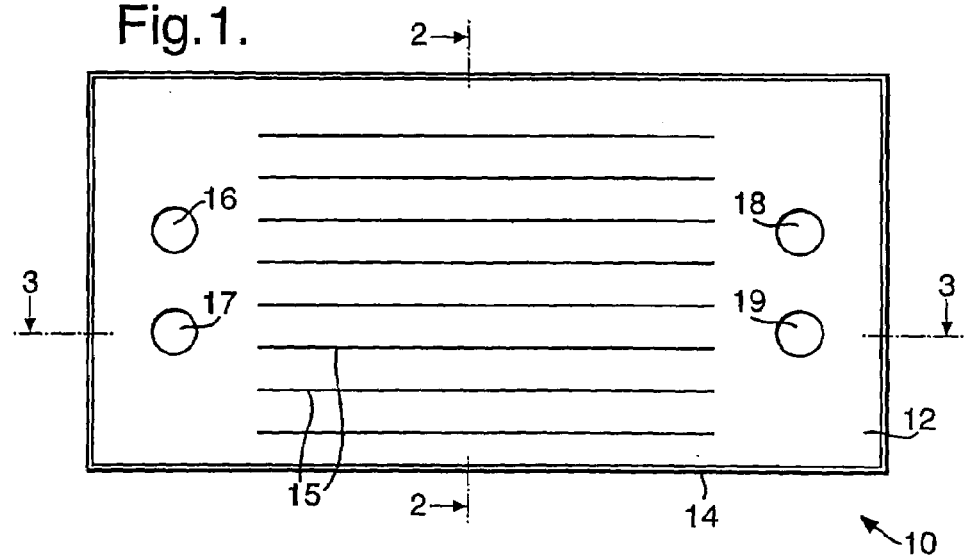
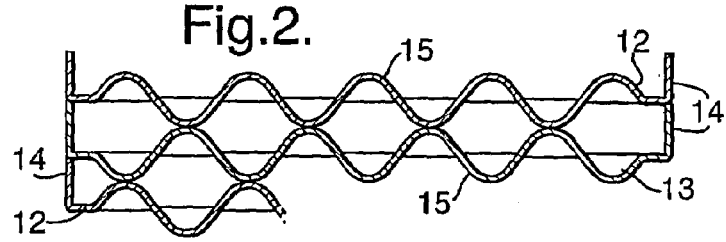
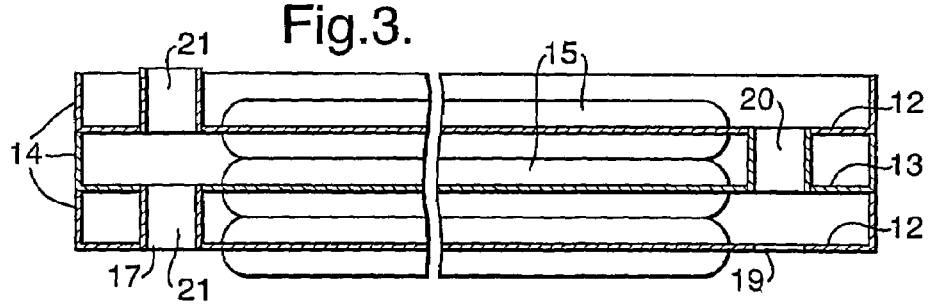
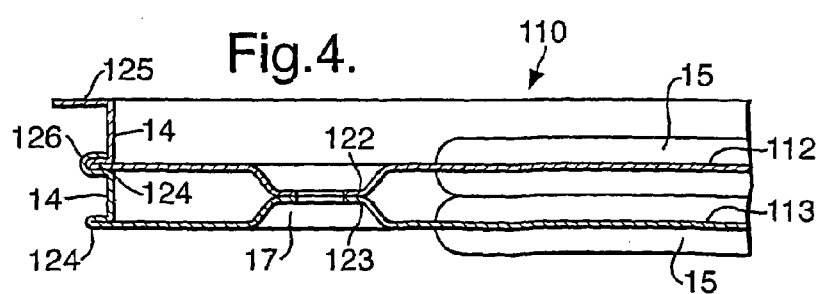

CATALYTIC REACTOR

This invention relates to a catalytic reactor suitable for use in performing gas phase reactions, and particularly but not exclusively for performing highly exothermic and endothermic reactions, and also to a chemical process using the catalytic reactor.

The use of catalytic material supported on a metal substrate is well known. For example GB 1 490 977 describes a catalyst comprising an aluminium-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles. In this context heat transfer between one channel and an adjacent channel is not a consideration, as all the channels carry the same gases at the same pressures. EP 0 885 653 A (Friedrich et al.) describes a compact heat exchanger for catalytic reactions in which flow channels are defined by a single long sheet of metal folded into a concertina, with corrugated foils located between successive plates of the concertina; the corrugated foils are catalyst supports and enhance heat transfer between the channels, and in one example the gases on one side of the sheet undergo an exothermic reaction while those on the other side undergo an endothermic reaction.

According to the present invention there is provided a catalytic reactor comprising a plurality of metal sheets arranged as a stack to define first flow channels between adjacent sheets, alternating with second flow channels between adjacent sheets, so as to ensure good thermal contact between fluids in the first and the second flow channels, each such sheet having a peripheral up-standing rim whereby it is sealed to the next sheet in the stack, and each sheet defining at least four apertures for flow of fluids, and tubular means for sealing apertures in one sheet to corresponding apertures in the next sheet in the stack.

The fluids in the channels may be gases or gas mixtures, and may also comprise droplets of liquid as an aerosol. Where a desired reaction is exothermic, a heat transfer liquid (rather than a gas) may be passed through the other set of flow channels.

Each sheet is preferably of thickness less than 3 mm, more preferably less than 1 mm. Each sheet may be corrugated to guide fluid flow along the flow channel between that sheet and the next, or alternatively a corrugated or zig-zag foil may be inserted in the flow channel. The sheets or the corrugated foils (where provided) in at least one of the flow channels incorporate a catalyst, which may be incorporated in a ceramic layer on the surface of the sheet or foil. Such a foil may alternatively be replaced by a permeable metal substrate such as a mesh or a fibrous metal sheet.

To ensure the required good thermal contact, both the first and the second flow channels are preferably less than 5 mm deep, that is to say the peripheral rims are less than 5 mm high. More preferably both the first and the second flow channels are less than 3 mm deep.

The tubular means linking apertures in successive sheets may be integral with one sheet or be welded to it before assembly, and during assembly is welded to the adjacent sheet. Similarly the rims on one sheet are welded to the periphery of the next sheet during assembly. For low pressure differences the joints may be made by crimping rather than welding.

In one use of the catalytic reactor, the gas mixture supplied to each channel is different from the gas mixture supplied to the adjacent channels, and the corresponding chemical reactions are also different. One of the reactions may be endothermic while the other reaction is exothermic. In that case heat is transferred through the wall of the sheet separating the adjacent channels, from the exothermic reaction to the endothermic reaction.

This reactor is particularly suitable for performing steam reforming of hydrocarbons (which is an endothermic reaction, generating hydrogen and carbon monoxide), and the alternate channels might contain a hydrocarbon/air mixture so that an exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or palladium on a metal hexaaluminate such as magnesium, calcium, strontium, barium or potassium hexaaluminate. For the reforming reaction also several different catalysts may be used, for example nickel, platinum, palladium, ruthenium or rhodium, which may be used on ceramic coatings; the preferred catalyst for the reforming reaction is rhodium or platinum on alumina or stabilised alumina. The oxidation reaction may be carried out at substantially atmospheric pressure, while the reforming reaction may be carried out at elevated pressure, for example up to 2 MPa (20 atmospheres), more typically in the range 0 to 200 kPa above atmospheric pressure. Both oxidation and reforming may be carried out at an elevated pressure (say 200 kPa), the reactor being enclosed within an external pressure vessel.

It will be appreciated that the materials of which the reactor are made may be subjected to a severely corrosive atmosphere in use, for example the temperature may be as high as 900° C., although more typically around 850° C. The reactor may be made of a metal such as an aluminium-bearing ferritic steel, in particular of the type known as Fecralloy (trade mark) which is iron with up to 20% chromium, 0.5–12% aluminium, and 0.1–3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the ceramic coating, so ensuring the catalytic material adheres to the metal substrate. The ceramic coating is preferably no more than 300 μm thick.

A problem with any catalytic reactor is that the catalyst may become less active, and hence need to be replaced. The reactor of the invention is of sufficiently light-weight construction that it may be discarded when the catalyst becomes spent.

For some purposes the catalyst metal might instead be deposited directly onto the adherent oxide coating of the metal (without any ceramic layer).

Especially if the reactor is to be used for an endothermic reaction, it may be desirable to raise the temperature of the reactor to a desired operating temperature by direct electrical heating, passing electric current through the sheets that form the reactor. This would typically only be done initially, the heat subsequently being provided by an exothermic reaction carried out in the second gas flow channels or by hot gases (for example exhaust gases from an external combustion process such as a laminar flow burner).

The invention will now be further and more particularly described, by way of example only, and with reference to the accompanying drawings in which:

BRIEF DESCRIPTION OF THE DRAWINGS

FIG. 1 shows a plan view of a reactor;

FIG. 2 shows a cross sectional view on the line 2—2 of the reactor of FIG. 1;

FIG. 3 shows a cross sectional view on the line 3—3 of the reactor of FIG. 1; and FIG. 4 shows a view equivalent to that of FIG. 3 of a modification of the reactor.

Reactors of the invention may be used in a chemical process for converting methane to longer chain hydrocarbons. The first stage involves steam/methane reforming, that is to say the reaction:

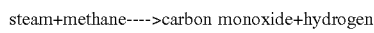
steam+methane---->carbon monoxide+hydrogen

This reaction is endothermic, and may be catalysed by a rhodium catalyst in a first gas flow channel. The heat required to cause this reaction may be provided by combustion of methane, that is to say:

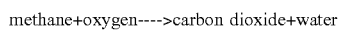
methane+oxygen---->carbon dioxide+water which is an exothermic reaction, and may be catalysed by a palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming is called synthesis gas. The hydrogen may be itself the desired product, for example for use in a fuel cell. Alternatively the gas mixture can then be used to perform a Fischer-Tropsch synthesis, that is to say:

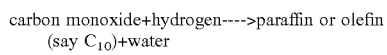
carbon monoxide+hydrogen---->paraffin or olefin
(say $C_{10}$)+water which is an exothermic reaction, occurring at an elevated temperature, typically between 200 and 350° C., for example 280° C., and an elevated pressure typically between 2 MPa and 4 MPa, for example 2.5 MPa, in the presence of a catalyst such as iron, cobalt or fused magnetite, with a potassium or ruthenium promoter. The exact nature of the organic compounds formed by the reaction depends on the pressure, the temperature and the catalyst, as well as the ratio of carbon monoxide to hydrogen. The heat given out by this synthesis reaction may be used to provide at least part of the heat required by the steam/methane reforming reaction, for example a heat transfer fluid such as water, helium or Dowtherm A (trade mark of Dow Chemical) may be used to transfer the heat from a reactor in which the Fischer-Tropsch synthesis is occurring, and to preheat at least one of the gas streams supplied to the reforming reactor.

For example, in the reforming step, a feed gas that consists primarily of methane with a small percentage (say 10%) of ethane and propane is heated to about 400° C., mixed with a stream of steam that is also at about 400° C. and is then supplied to a catalytic reactor. Both streams may be at atmospheric pressure, or for example at a pressure of say 100 kPa above atmospheric. The flows are preferably such that the steam:methane molar ratio is between 1:1 and 2:1. The first part of the reactor is a pre-reformer with a nickel methanation catalyst at 400° C., in which the higher alkanes react with the steam to form methane (and carbon monoxide); this pre-reformer is not required if the feed gas contains substantially no higher alkanes. The second part of the reactor is a reformer with a platinum/rhodium catalyst, in which the methane and steam react to form carbon monoxide and hydrogen. This reaction may be performed at 850° C. The heat for the endothermic reactions may be provided by combustion of methane over a palladium or platinum catalyst within adjacent gas flow channels, or alternatively from exhaust gases from an external combustion unit such as a laminar flow burner, the gases from the burner flowing in counter-current to the gas flow through the reformer; this can enable the reacting gases in the reformer to reach a final temperature of as much as 1000° C. Where catalytic combustion is used, the catalyst may incorporate a metal hexaaluminate (such as magnesium hexaaluminate) as the substrate, but a preferred catalyst is platinum and palladium (10% weight) on γ-alumina. The methane/oxygen mixture may be supplied in stages along the reactor, to ensure combustion occurs throughout its length.

The hot mixture of carbon monoxide and hydrogen emerging from the reformer may be used to provide heat to the steam and to the feed gas. It may then be further processed, for example being compressed and supplied to a catalytic reactor in which the gases react, undergoing Fischer-Tropsch synthesis to form a range of hydrocarbon compounds such as paraffins. The overall result of the processes is that methane is converted to higher molecular weight hydrocarbons which are typically liquids at ambient temperatures. The desired hydrocarbons can therefore be separated from the remaining gases by cooling, so the liquids condense. The processes may be used at an oil or gas well to convert methane gas into a liquid hydrocarbon which is easier to transport.

Referring now to the figures, a reactor 10 (suitable for example for steam/methane reforming) comprises a stack of plates 12 and 13 arranged alternately, each of Fecralloy steel, each rectangular 500 mm long and 325 mm wide. Each plate 12 and 13 is of tray-like form, the steel being of thickness 150 μm, turned up around the periphery to form a rim 14 of height 2 mm. As shown particularly in FIG. 2, the central portion of each plate 12 and 13 is corrugated, the corrugations 15 extending 1 mm above and below the central plane, the corrugations 15 in the plates 13 being of the same shape but of opposite phase to those in the plates 12, so that the ridges in one plate 12 contact the troughs in the next plate 13. As shown in FIG. 1, each plate 12 and 13 defines four apertures 16, 17, 18 and 19. Tubes 20 of length 2.3 mm are welded into the apertures 16 and 19 of each plate 13; and identical tubes 21 are welded into the apertures 17 and 18 of each plate 12, so each tube 20 and 21 projects 0.15 mm higher than the corresponding rim 14.

The stack is assembled by placing the plates 12 and 13 alternately on top of each other and welding the top of each rim 14 onto the periphery of the next plate. When each plate 13 is placed on the stack the tubes 21 projecting above the plate 12 locate in the corresponding apertures 17 and 18, and are welded around their top edge to the plate 13. Similarly, when each plate 12 is placed on the stack, the tubes 20 projecting above the plate 13 locate in the corresponding apertures 16 and 19, and are welded around their top edge to the plate 12. At the bottom of the stack is a plate (not shown) identical to the other plates 12 but with no apertures; and at the top of the stack is a plate 13, inlet and outlet pipes (not shown) being welded to each of the apertures 16, 17, 18 and 19.

It will thus be appreciated that the top of plates 12 and the underside of plates 13 define one set of flow channels, all of which communicate via the apertures 16 and 19; and the top of plates 13 and the underside of plates 12 define a separate set of flow channels, communicating via the apertures 17 and 18. Appropriate catalysts are coated (prior to assembly) onto the corrugations 15 on each surface of each plate 12 and 13 according to the desired chemical reaction in that flow channel.

Hence in use for steam/methane reforming, steam/methane mixture is supplied at atmospheric pressure to aperture 19 at the top of the stack, and the resulting mixture of hydrogen and carbon monoxide emerges through the aperture 16 at the top of the stack having flowed along the paths above the plates 12. Methane/air mixture at atmospheric pressure is supplied through the aperture 17 at the top of the stack, so exhaust gas from the combustion process emerges through the aperture 18 at the top of the stack having flowed along the paths below the plates 12 (and hence above the plates 13). Hence the gas flows within the reactor 10 are countercurrent, so that the hottest region in the combustion channels, which is near the inlet to those channels, is closest to the outlet for the steam/methane reforming reaction. The flow paths might alternatively be arranged to be co-current.

It will be understood that the type of ceramic deposited on the corrugations 15 in the two gas flow channels may be different, and that the catalyst materials may differ also. For example the ceramic might comprise alumina in one of the gas flow channels, and zirconia in the other gas flow channels. Furthermore the pitch or pattern of the corrugations 15 may vary along a flow path to adjust catalytic activity, and hence provide for control over the temperatures or reaction rates at different points in the reactor 10. Furthermore parts of the plates 12 and 13 may have different catalyst loadings, or may be devoid of catalyst.

In the reactor 10 described above, the apertures in all the plates 12 and 13 are indicated as being of the same size, but to improve flow distribution within the stack it may be desirable for the apertures (and corresponding tubes) in part of the stack to be larger than the apertures in other parts of the stack. Furthermore the apertures 16, 17, 18 and 19 within any one plate 12 or 13 might be of different sizes. The tubes 20 and 21 (and apertures) might be of non-circular cross-section; and, whether circular or not, might be integral with one or other of the plates 12 or 13 (being formed by deformation in a press) rather than being separate components welded to the plates 12 and 13. In another modification to the reactor 10, the plates 12 and 13 are again of Fecralloy material, but the catalyst material is deposited directly onto the oxide layer of the Fecralloy.

In another modification of the reactor, all the plates 12 and 13 are flat, but separate catalyst-carriers are located in the gas flow channels as required. These may for example be corrugated foils of Fecralloy steel, for example of thickness 50 μm. The foils enhance heat transfer, as well as acting as support for the catalyst, and guides for the gas flow. In this case in particular, the plates 12 and 13 may be of a different material such as 304 or 310 stainless steel, or Incalloy 800 HT, or titanium. Alternatively, instead of these corrugated foils, a mesh, or a corrugated sheet of sintered metal fibres of voidage above 60% might be coated with a ceramic and a catalyst for use in the gas flow channels.

Referring now to FIG. 4, this shows a view, partly broken away, equivalent to that of FIG. 3, of two plates 112 and 113 of a reactor 110 differing from the reactor 10 in the way the plates are joined together. In other respects the reactor 110 is the same as the reactor 10. The plates 112 and 113 have corrugations 15 along their central sections. At each aperture (only aperture 17 is shown) the plates 112 and 113 are pressed down or up so the two plates rest on each other at a rim 122 and 123, and the rims 122 and 123 may be welded together. Each plate 122 and 113 is of tray-like form and of thickness 150 μm, turned up around the periphery to form an upstanding rim 14 of height 2 mm, but in this case each plate 112 and 113 also forms a peripheral narrow flange 124 just below the rim 14, and a wider peripheral flange 125 at the top of the rim 14. During assembly of the stack formed of the plates 112 and 113, the narrow lower flange 124 of a plate rests on the wider upper flange 125 of a plate already in the stack, and the wider flange 125 is then bent around the narrow flange 124 to form a crimped joint 126. Such crimped joints 126 are satisfactory where the pressure differences between the two gas streams are not high. It will be appreciated that the joint between the rims 122 and 123 at the apertures (such as apertures 17) may also be made by crimping.

In an alternative mode of use, the combustion takes place in an external burner (such as a laminar flow burner), the very hot exhaust gases at about 900 or 1000° C. being passed through the reactor 10 or 110 in place of the methane/air mixture, and so in counter-current to the methane/steam flow. In this case it is not necessary to provide catalyst in those channels.

In the heating channels of the catalytic reactor 10, 110, if catalytic combustion is used to generate the heat (as described above), the combustion catalyst may itself be coated with a thin porous inert ceramic layer, so as to restrict the contact of the gas mixture with the catalyst and so restrict the reaction rate particularly at the start of the channel, if a more gradual approach to maximum temperature is required.

As mentioned earlier, electrical heating by passing an electric current directly through the plates forming the reactor may be used initially to raise the temperature of the catalytic reactor to say 400° C. before supplying gases, to ensure a catalytic combustion occurs. Such electrical heating may also be used during operation to adjust the reactor temperature. Electrical heating may also be used in the vicinity of the outlet from the reactor to ensure that a temperature of say 900° C. is reached by the gases undergoing the reforming reaction.

The invention claimed is:

1. A catalytic reactor comprising a plurality of metal sheets arranged as a stack to define first flow channels between adjacent sheets, alternating with second flow channels between adjacent sheets, so as to ensure good thermal contact between fluids in the first and the second flow channels, each such sheet having a peripheral up-standing rim around its entire periphery whereby it is sealed to the next sheet in the stack around its entire periphery so that said first and second flow channels are defined between opposed major surfaces of successive sheets, and each sheet defining at least four apertures for flow of fluids, and tubular means for sealing apertures in one sheet to corresponding apertures in the next sheet in the stack, and means for supplying and withdrawing first and second fluids to and from said first and second flow channels, respectively, via respective pairs of said apertures.

2. A catalytic reactor as claimed in claim 1 wherein each sheet is of thickness no more than 1 mm.

3. A catalytic reactor as claimed in claim 1 wherein each sheet is corrugated for guiding fluid flow along the flow channel between that sheet and the next.

4. A catalytic reactor as claimed in claim 3 wherein said corrugations in each sheet project both above and below a central plane of said sheet, and wherein said corrugations are provided over only a central region of each sheet, end regions of each sheet being flat.

5. A catalytic reactor as claimed in claim 4 wherein said corrugations in successive sheets in said stack are of opposite phase, so the peaks of one sheet contact the troughs of the next sheet.

6. A catalytic reactor as claimed in claim 1 incorporating a catalyst on at least one surface of each sheet.

7. A catalytic reactor as claimed in claim 6 wherein the catalyst is incorporated in a ceramic layer on the surface of the sheet.

8. A catalytic reactor as claimed in claim 1 wherein the tubular means linking apertures in successive sheets is integral with one or both sheets.

9. A catalytic reactor as claimed in claim 1 wherein said stack also incorporates an end sheet with a peripheral up-standing rim around its entire periphery whereby it is sealed to the next sheet in the stack around its entire periphery, but defining no apertures, this sheet without apertures defining an end of said stack.

10. A process for performing steam reforming of a hydrocarbon, wherein the steam reforming is performed in a catalytic reactor as claimed in claim 1, said process including the steps of supplying steam and the hydrocarbon to said first flow channels of said catalytic reactor, said first flow channels containing a catalyst for facilitating the steam reforming reaction, and supplying an exothermic gas stream to said second flow channels of the catalytic reactor.

* * * * *